(12) United States Patent
Albot et al.

(10) Patent No.: US 10,620,932 B2
(45) Date of Patent: Apr. 14, 2020

(54) REPLACING AN ACCELERATOR FIRMWARE IMAGE WITHOUT OPERATING SYSTEM REBOOT

(71) Applicant: International Business Machines Corporation, Armonk, NY (US)

(72) Inventors: Andre L. Albot, Austin, TX (US); Vishal C. Aslot, Austin, TX (US); Thomas V. Burks, III, Cedar Park, TX (US); John D. Dietel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 15/846,132

(22) Filed: Dec. 18, 2017

(65) Prior Publication Data

US 2018/0107472 A1 Apr. 19, 2018

Related U.S. Application Data

(63) Continuation of application No. 15/403,465, filed on Jan. 11, 2017, now Pat. No. 9,898,277, which is a
(Continued)

(51) Int. Cl.
*G06F 9/46* (2006.01)
*G06F 8/65* (2018.01)
(Continued)

(52) U.S. Cl.
CPC ............... *G06F 8/65* (2013.01); *G06F 12/10* (2013.01); *G06F 12/109* (2013.01);
(Continued)

(58) Field of Classification Search
CPC .......... G06F 8/65; G06F 12/10; G06F 12/109; G06F 13/1668; G06F 13/24; G06F 13/4282; G06F 2212/657
See application file for complete search history.

(56) References Cited

U.S. PATENT DOCUMENTS

| 5,751,979 A | 5/1998 | McCrory |
| 6,434,696 B1 * | 8/2002 | Kang ........................ G06F 1/24 |
| | | 713/2 |

(Continued)

OTHER PUBLICATIONS

Harbaum, Till et al., Flexible Hardware Support for Interworking Systems, 1999, 10 pages, Architecture of Computing Systems, Jena, Germany.

(Continued)

*Primary Examiner* — Camquy Truong
(74) *Attorney, Agent, or Firm* — Patterson + Sheridan, LLP (57) ABSTRACT

The present disclosure relates to updating a firmware image on a coherent hardware accelerator concurrently with executing operations on the coherent hardware accelerator. According to one embodiment, while executing accelerator-enabled operations on the coherent hardware accelerator, a system stores a firmware update package in a local memory on the coherent hardware accelerator. Once the firmware update package is stored in local memory on the coherent hardware accelerator, the system restarting the coherent hardware accelerator by pausing the execution of at least a first operation initiated on the coherent hardware accelerator and applying the firmware update package to the firmware image on the coherent hardware accelerator. Once the firmware update package is applied to the coherent hardware accelerator, the system resumes the operation on the coherent hardware accelerator.

20 Claims, 7 Drawing Sheets

Related U.S. Application Data continuation of application No. 14/925,768, filed on Oct. 28, 2015, now Pat. No. 9,710,254.

(51) Int. Cl.

| | | |
|---|---|---|
| *G06F 13/16* | (2006.01) | |
| *G06F 13/24* | (2006.01) | |
| *G06F 12/109* | (2016.01) | |
| *G06F 12/10* | (2016.01) | |
| *G06F 13/42* | (2006.01) | |

(52) U.S. Cl.
CPC .......... *G06F 13/1668* (2013.01); *G06F 13/24* (2013.01); *G06F 13/4282* (2013.01); *G06F 2212/657* (2013.01); *G06F 2213/2424* (2013.01)

(56) References Cited

U.S. PATENT DOCUMENTS

| | | |
|---|---|---|
| 8,145,894 B1 | 3/2012 | Casselman |
| 8,904,055 B2 | 12/2014 | Sato |
| 8,966,474 B2 | 2/2015 | Herington |
| 9,128,866 B2 | 9/2015 | Yan et al. |
| 9,710,254 B2 | 7/2017 | Albot et al. |
| 2012/0117348 A1 | 5/2012 | Triantafillou et al. |
| 2015/0040113 A1 | 2/2015 | Muench-Casanova et al. |
| 2015/0066878 A1 | 3/2015 | Agarwal et al. |
| 2015/0293776 A1 | 10/2015 | Persson et al. |
| 2017/0123780 A1 | 5/2017 | Albot et al. |
| 2017/0161054 A1 | 6/2017 | Albot et al. |

OTHER PUBLICATIONS

Schmidt, Andrew G. et al., Checkpoint/Restart and Beyond: Resilient High Performance Computing with FPGAs, IEEE International Symposium on Field-Programmable Custom Computing Machines, pp. 162-169, 2011, IEEE, Piscataway, United States.

Vitkovskiy, Arseniy, Memory Hierarchy and Data Communication in Heterogeneous Reconfigurable Socs, Dissertation thesis). The University of Bologna, pp. 1-244, Apr. 2008, Bologna, Italy.

Lattanzi, et al. Exploring Coprocessor Interfaces in an Embedded Java Environment, 9 pages, 2003, WSEAS Transactions on Computers, Split, Croatia.

\* cited by examiner

REPLACING AN ACCELERATOR FIRMWARE IMAGE WITHOUT OPERATING SYSTEM REBOOT

CROSS-REFERENCE TO RELATED APPLICATIONS

This application is a continuation of U.S. patent application Ser. No. 15/403,465, filed Jan. 11, 2017, now U.S. Pat. No. 9,898,277, which is a continuation of U.S. patent application Ser. No. 14/925,768, now U.S. Pat. No. 9,710,254, filed on Oct. 28, 2015, and which is hereby incorporated by reference in its entirety.

BACKGROUND

The present invention relates to updating accelerator firmware images, and more specifically to performing firmware updates on an accelerator without rebooting the operating system of a computer on which the accelerator is installed.

In some computer systems, accelerators may be installed to accelerate various specialized operations, such as graphics processing, encryption and decryption, compression and decompression, massively parallel processing (e.g., big data processing, fluid dynamic simulations, and so on), and other computationally expensive tasks. Accelerator systems may be designed as an add-on board that interfaces with a processor via a physical bus (e.g., PCI Express). As processes run on these accelerator systems, the accelerator interfaces with system memory using direct memory access in which the accelerator accesses regions of memory using real, rather than virtual, addresses. By accessing memory using direct memory access, an accelerator can bypass the memory management systems built into CPUs installed in a system.

In some cases, an accelerator may be designed to interface with system memory using a virtual memory space established by a CPU. A process can attach to the accelerator and create a context, which includes information about the virtual memory space allocated to the process, as well as other information. While the process executes on the accelerator, the accelerator can read from and write to system memory using virtual addresses associated with the virtual memory space in lieu of direct memory access using physical memory addresses.

Generally, an accelerator is shipped with a firmware image that defines accelerator functionality. Over time, an accelerator manufacturer may make new firmware images available for an accelerator in order to improve existing accelerator functionality or add functionality to an accelerator. To update an accelerator, an image is downloaded, and the system may be taken offline and rebooted. Once the system is rebooted, the accelerator activates the firmware update, and subsequent operations on the system may take advantage of the updated functionality made available through the firmware update.

SUMMARY

One embodiment disclosed herein includes a method for updating firmware on a coherent hardware accelerator concurrently with executing operations on the coherent hardware accelerator. The method generally includes, while executing accelerator-enabled operations on the coherent hardware accelerator, storing a firmware update package in a local memory on the coherent hardware accelerator (e.g., a flash chip). Once the firmware update package is stored in local memory on the coherent hardware accelerator, the system restarts the coherent hardware accelerator by pausing the execution of at least a first operation initiated on the coherent hardware accelerator and applying the firmware update package to the firmware image on the coherent hardware accelerator. Once the firmware update package is applied to the coherent hardware accelerator, the system resumes the operation on the coherent hardware accelerator.

Another embodiment includes a computer-readable storage medium having instructions, which, when executed on a processor, performs an operation for updating firmware on a coherent accelerator concurrently with executing operations on the coherent hardware accelerator. The operations generally include, while executing accelerator-enabled operations on the coherent hardware accelerator, storing a firmware update package in a local memory on the coherent hardware accelerator. Once the firmware update package is stored in local memory on the coherent hardware accelerator, the system restarts the coherent hardware accelerator by pausing the execution of at least a first operation initiated on the coherent hardware accelerator and applying the firmware update package to the firmware image on the coherent hardware accelerator. Once the firmware update package is applied to the coherent hardware accelerator, the system resumes the operation on the coherent hardware accelerator.

Still another embodiment includes a processor and a memory storing a program, which, when executed on the processor, performs an operation for updating firmware on a coherent accelerator concurrently with executing operations on the coherent hardware accelerator. The operations generally include, while executing accelerator-enabled operations on the coherent hardware accelerator, storing a firmware update package in a local memory on the coherent hardware accelerator. Once the firmware update package is stored in local memory on the coherent hardware accelerator, the system restarts the coherent hardware accelerator by pausing the execution of at least a first operation initiated on the coherent hardware accelerator and applying the firmware update package to the firmware image on the coherent hardware accelerator. Once the firmware update package is applied to the coherent hardware accelerator, the system resumes the operation on the coherent hardware accelerator.

DETAILED DESCRIPTION

Embodiments presented herein describe techniques for updating a firmware image on a coherent hardware accelerator during system runtime (also known as a "concurrent update"). Because the system on which the coherent hardware accelerator is installed need not be shut down and rebooted to apply the firmware image to the accelerator, performing a concurrent update on an accelerator limits system downtime. The system may pause operations that were previously executing on the accelerator during the firmware update and resume the operations on the accelerator when the accelerator completes the firmware update. In pausing an operation that was previously executing on the accelerator, the system may force processes that used the accelerator prior to the firmware update to discontinue using the accelerator until the accelerator completes the firmware update. By performing a concurrent update on an accelerator, the system may provide substantially uninterrupted service to programs and client devices that request data from accelerator-executed programs (e.g., large database systems).

Figure 1:
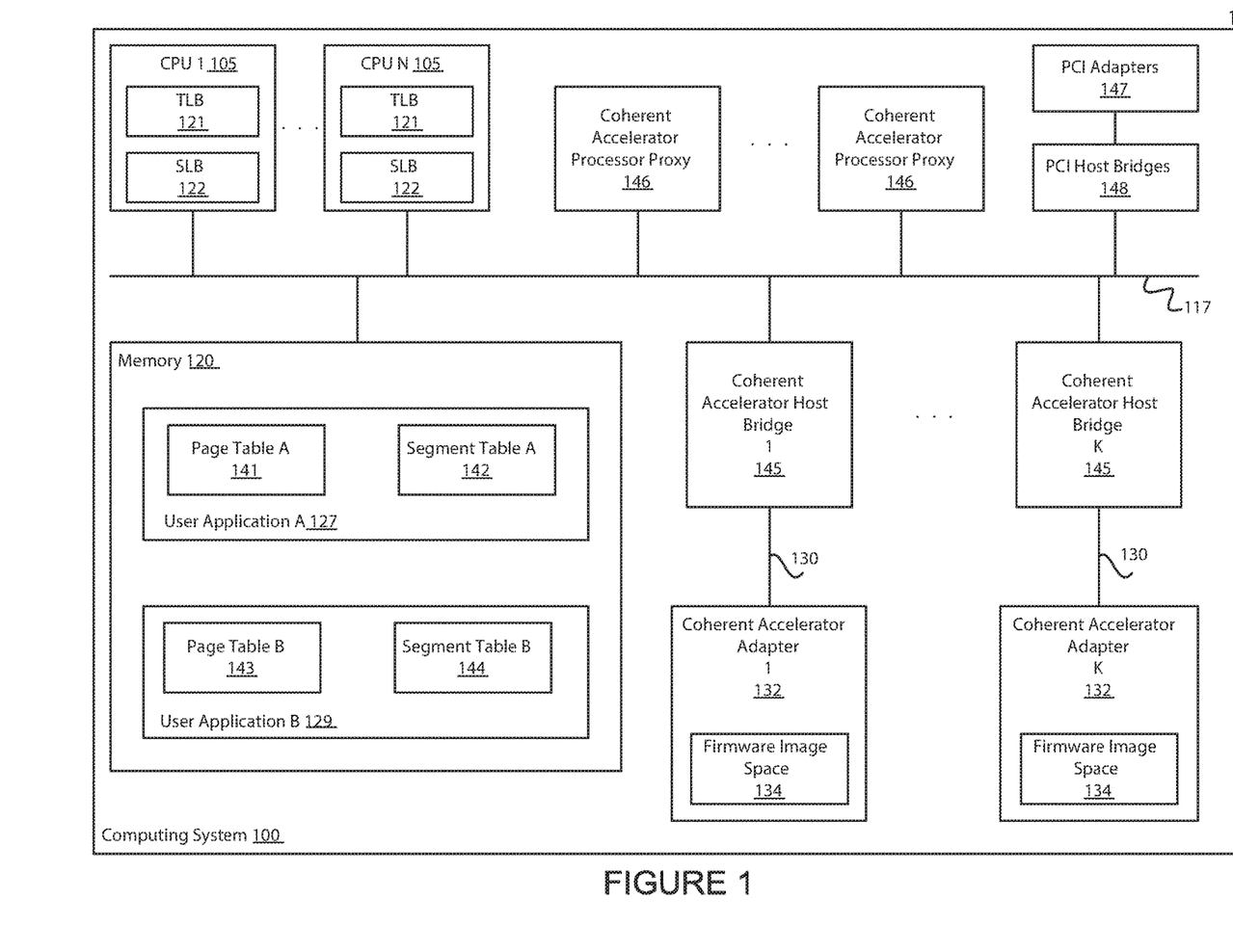
FIG. 1 illustrates an example system architecture in which a processor and accelerator share a virtual memory space, according to one embodiment.

FIG. 1 illustrates an example computing system 100 configured with an FPGA-based coherent accelerator, according to one embodiment. As shown, computing system 100 includes one or more central processing units (CPUs) 1-N 105, one or more coherent accelerator processor proxies (CAPPs) 146, one or more peripheral component interconnect (PCI) adapters 147, one or more PCI host bridges 148, a memory 120, one or more coherent accelerator host bridges 1-K 145, and one or more coherent accelerator adapters 1-K 132. The CPUs 105, CAPPs 146, PCI host bridges 148, memory 120, and coherent accelerator host bridges 145 may each be connected via an interconnect bus 117. Further, the coherent accelerator adapters 132 may each connect with a respective coherent accelerator host bridge 145. The computing system may also include an I/O device interface connecting I/O devices (e.g., keyboard, display, and mouse devices) to the computing system 100. Storage devices may be connected via one of the coherent accelerator adapters 132 or PCI adapters 147. The CPUs 105 each include a translation lookaside buffer (TLB) 121 and a segment lookaside buffer (SLB) 122.

Each CPU 105 retrieves and executes programming instructions stored in the memory 120 as well as stores and retrieves application data residing in the storage devices. The bus 117 is used to transmit programming instructions and application data between the CPUs 105, CAPPs 146, PCI host bridges 148, coherent accelerator host bridges 145, and memory 120. In one embodiment, CPU 105 is representative of the "POWER" microprocessor by IBM.

In one embodiment, the coherent accelerator adapter 132 is a FPGA-based hardware accelerator that may directly access an effective address space of an application (e.g., the user application A 127, user application B 129, etc.). Each application has its own effective address space. For example, a 32-bit process may have an effective address space from $2^0$ to $2^{32}$. Further, each address space comprises a number of virtual memory segments. A segment is logical container of pages. A page is a fixed-size piece of memory. The 32-bit effective address space described in this example may contain up to sixteen segments. As another example, a 64-bit effective address space may contain up to $2^{36}$ segments.

Further still, each effective address in a process effective address space includes an effective segment identifier (ESID), which specifies a segment for that effective address.

In some systems, effective addresses in a user application address space do not map directly to real memory. In one embodiment, an operating system of computing system 100 maintains a global virtual address space that maps to real memory. Further, the global virtual address space comprises a number of segments, where each virtual address includes a virtual segment identifier (VSID) that specifies a segment for that virtual address. In addition, each effective address maps into a location in the global virtual address space.

The coherent accelerator adapter 132 provides a general purpose framework for transferring data to and from application memory, without requiring a direct memory access (DMA) setup. As a result, the coherent accelerator adapter 132 significantly reduces the I/O path length (e.g., from tens of thousands of instructions to a few hundred instructions). Further, the coherent accelerator adapter 132 allows developers to customize on the FPGA without having to create additional software to do so. For instance, user application A 127 is an example of a process that is configured to issue commands to the coherent accelerator adapter 132. Other applications that are not configured to issue commands to the coherent accelerator adapter 132 (e.g., user application B) may still execute within the framework provided by the coherent accelerator adapter 132. As further described below, the coherent accelerator adapter 132 provides data transfer between storage devices and applications via a virtual address space. In one embodiment, the coherent accelerator adapter 132 includes a processor service layer (not shown) that translates virtual addresses to real addresses to provide coherence. Further, processor service layer generates page faults and Accelerator Function Unit (AFU)-specific interrupts.

In one embodiment, the user application A 127 includes a page table A 141 and a segment table A 142. In addition, the user application B 129 includes a page table B 143 and a segment table B 144. The page tables 141 and 143 map virtual pages to corresponding physical addresses in memory 120. The segment tables 142 and 144 stores mappings of effective addresses to virtual addresses for their respective application. In one embodiment, the TLB 121 and the SLB 122 of the CPU 105 are lookaside buffers used by the coherent accelerator adapter 132 to maintain recent translations of memory addresses. For instance, the SLB 122 may maintain recent translations of effective addresses to virtual addresses. In addition, the TLB 121 may maintain recent translations of virtual addresses to real addresses. In one embodiment, the page tables 141 and 143, segment tables 142 and 144, TLB 121, and SLB 122 may be included in a memory management unit (MMU). In one embodiment, the CAPPs 146 enforce coherence in the processor service layers of each coherent accelerator adapter 132. To do so, the CAPPs 146 may monitor coherency traffic (e.g., relating to cache coherence, page table coherence, segment table coherence, etc.) on the bus 117.

Further, the coherent accelerator adapter 132 may provide a number of contexts in user space and kernel space in that include a shared page table and segment table. Each context may be shared by multiple processes (e.g., user applications A and B) executing in the memory 120. A shared kernel context provides a kernel device driver that interfaces between a given process and the coherent accelerator adapter 132.

Firmware image space 134 may be, for example, a flash memory device installed on a coherent accelerator adapter 132 to store one or more accelerator firmware images. To update the firmware on coherent accelerator adapter 132, a user can download a firmware image to permanent storage (not shown) on the system 100. The downloaded firmware update may be transferred from permanent storage on system 100 to firmware image space 134 on coherent accelerator adapter 132. After applying the downloaded firmware update to the coherent accelerator adapter 132, the coherent accelerator adapter 132 may store the previous firmware image in firmware image space 134. If a system administrator determines that the firmware update should be rolled back (e.g., due to system instability), the system administrator can force the accelerator to reset and revert to the previous firmware image stored in firmware image space 134. In some cases, the firmware update package may update the functionality of coherent accelerator adapter 132; alternatively, the firmware update package may convert accelerator functionality from a one type of function (e.g., compression/decompression) to a different type of function (e.g., encryption/decryption).

While system 100 transfers the downloaded firmware image to firmware image space 134 on coherent accelerator adapter 132, processes that use the accelerator device may continue to execute on the accelerator device. After system 100 completes the transfer, coherent accelerator adapter 132 may trigger a reset event. The reset event may trigger enhanced error handling routines at the operating system kernel to pause any processes executing on the coherent accelerator adapter 132 and clear the contexts associated with the coherent accelerator adapter 132. When coherent accelerator adapter 132 restarts, the processes that previously executed on the accelerator can re-establish hardware contexts on the coherent accelerator adapter 132 and resume execution on the coherent accelerator adapter 132. When the process re-establishes a hardware context on the coherent accelerator adapter 132, page tables 113 and segment table 114 should remain unchanged from when process execution was paused.

In some cases, processes that are paused when concurrent firmware update procedures begin on the coherent accelerator adapter 132 may be resumed using a software algorithm that executes on CPU 110 (or specifically, on one or more processor cores 112) while firmware update procedures execute on coherent accelerator adapter 132. After the firmware update procedures complete, the processes may be paused on CPU 110. Each process can reattach to the coherent accelerator adapter 132 by requesting that the operating system kernel create a hardware context for the process (or a set of related processes). After a process reattaches to coherent accelerator adapter 132, the process can resume executing on the accelerator device from the point at which operations were paused on CPU 110. The page tables and segment tables restored to the coherent accelerator adapter 132 may reflect data read from and written to memory while the processes executed on CPU 110. While the processes may execute on CPU 110 with reduced performance compared to when the processes execute on the coherent accelerator adapter 132, transferring process execution from coherent accelerator adapter 132 to CPU 110 may provide for substantially uninterrupted process execution while coherent accelerator adapter 132 applies a firmware update.

In some cases, a coherent accelerator adapter 132 may be implemented for input and output acceleration (e.g., to provide high throughput data access to data sources). When firmware update procedures execute on such a coherent hardware accelerator, data input and output may be paused until the firmware update procedures complete. Once completed, a process that uses coherent accelerator adapter 132 to perform data input and output can re-execute any data input/output operations that did not complete successfully due to the firmware update procedures executing on coherent accelerator adapter 132.

Figure 2:
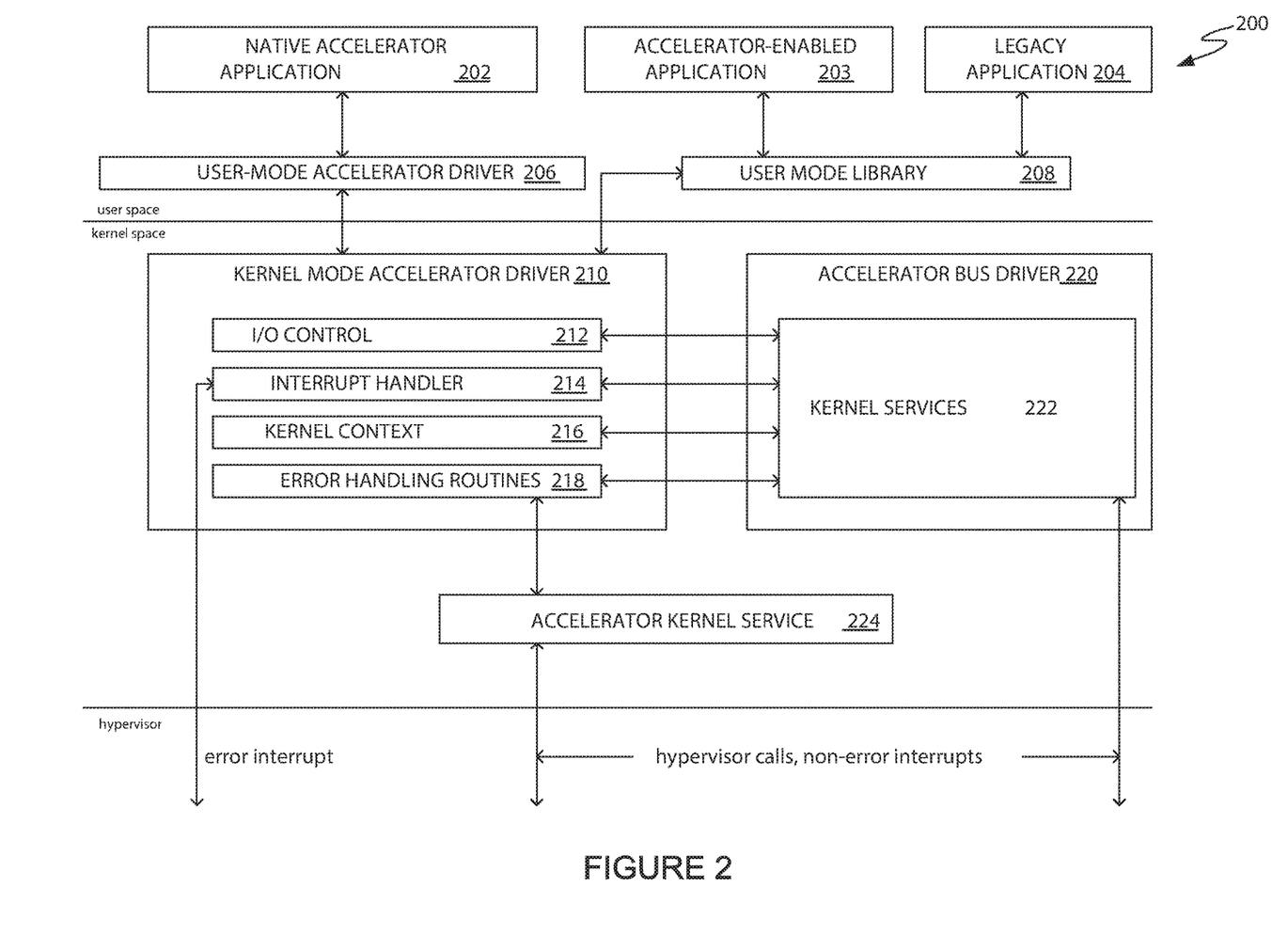
FIG. 2 illustrates an example process architecture for interfacing with an accelerator that uses a processor virtual memory space, according to one embodiment.

FIG. 2 illustrates an example process architecture 200 for interfacing with a coherent accelerator that uses the same virtual memory space as a CPU, according to one embodiment. As illustrated, process architecture 200 may be divided into a user space, a kernel space, and a hypervisor space.

Applications with varying degrees of accelerator awareness may execute in the user space. A native accelerator application 202 may contain a full user-mode accelerator driver 206 inside the native accelerator application 202 and use its own context on a coherent accelerator adapter 132. Accelerator-enabled applications 203, which can optionally use a coherent accelerator adapter 132, and legacy applications 204, which may be unaware of accelerator functionality, can communicate with a coherent accelerator using a user-mode library 208. Accelerator functionality may be encapsulated within user mode library 208. For accelerator-enabled applications 203, each application may share an accelerator hardware context or use its own accelerator hardware context. For legacy applications 204, a small number of kernel contexts may be established on the accelerator, and the legacy applications 204 may share these kernel contexts. The number of legacy applications 204 that can share a kernel context may be a fixed number defined by the operating system on which the legacy applications 204 execute.

In the kernel space, a kernel mode accelerator driver 210 provides I/O control 212, an interrupt handler 214, a kernel context 216, and error handling routines 218 to a native accelerator application 202 or to a user mode library 208 through which accelerator-enabled applications 203 and legacy applications 204 interact with a memory-coherent accelerator adapter 132. I/O control 212, interrupt handler 214, kernel context 216, and error handling routines can transmit messages to an accelerator bus driver 220 to communicate with a coherent accelerator adapter 132. For example, I/O control 212 and interrupt handler can transmit enhanced error handling messages to accelerator bus driver 220 to obtain data about the error handling capabilities of an coherent accelerator adapter 132. Interrupt handler 214 can additionally raise error interrupts and transmit the error interrupts to the hypervisor space for further handling.

Error handling routines 218 can transmit and receive enhanced error handling messages from accelerator bus driver 220. Error handling routines 218 can pass the received error handling messages to accelerator kernel service 224 for further processing (e.g., error recovery). As part of processing the received error handling messages, accelerator kernel service can perform hypervisor calls and inject non-error interrupts into the system.

Accelerator bus driver 220 generally includes a kernel services module 222. Kernel services module 222 may provide enhanced error handling services to kernel mode accelerator driver 210, as discussed above. Additionally, kernel services module 222 may provide direct memory access functionality to kernel mode accelerator driver 210.

Figure 3:
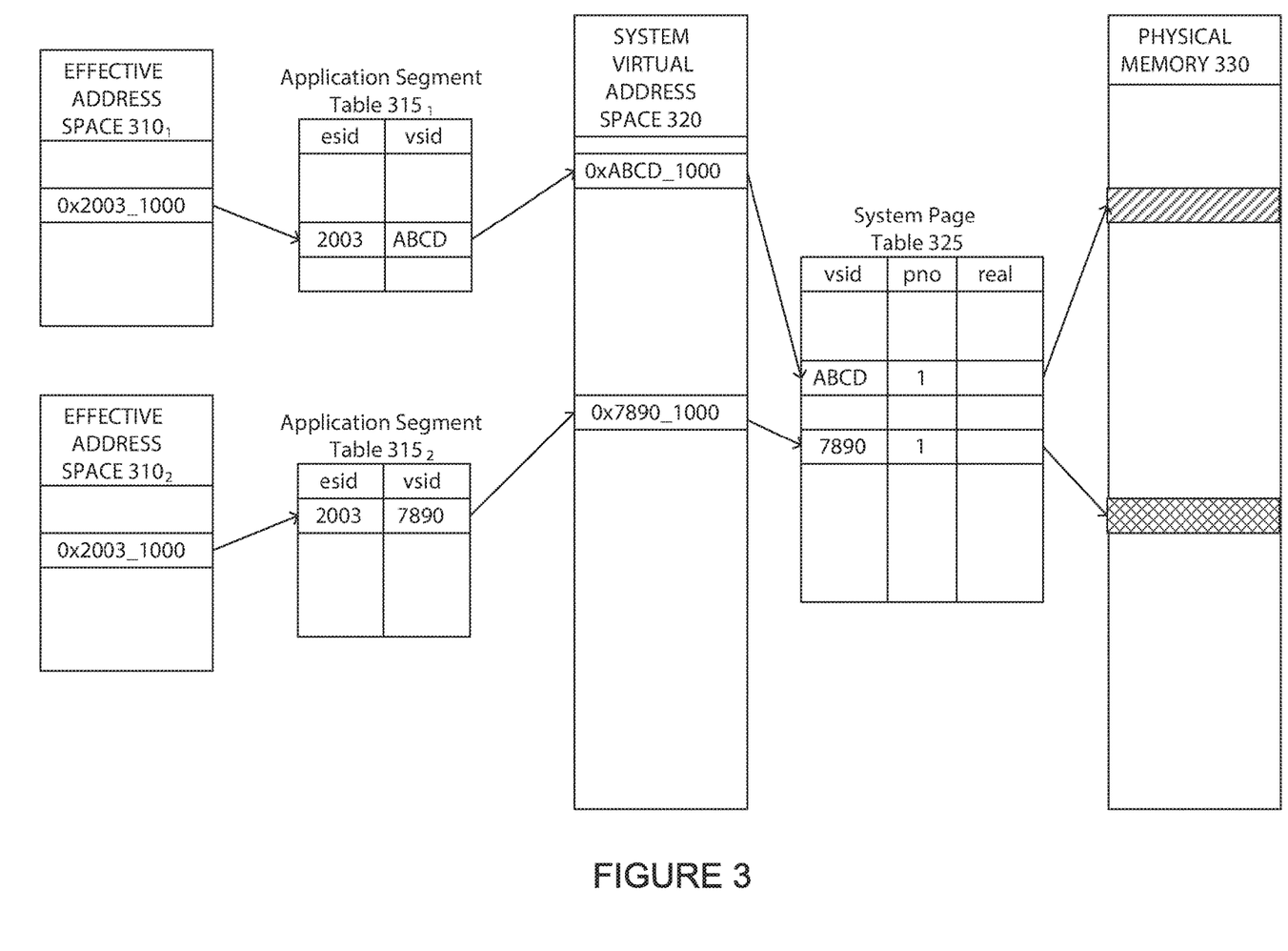
FIG. 3 illustrates an example memory system architecture in which a processor and accelerator can read from or write to memory using virtual addresses, according to one embodiment.

FIG. 3 illustrates an example memory structure in which a CPU 110 and coherent accelerator adapter 132 can use virtual addresses in segment and page tables to read from and write to physical memory, according to one embodiment. As illustrated, each process (and the kernel, which is not illustrated) may have its own unique effective address space 310. An address generated by a process is an effective address. An effective address may be mapped to an address in a system wide virtual address space 320, which then may be mapped to a real address in physical memory 330.

As illustrated, to obtain a system virtual address from an effective address, a CPU or accelerator can access an application segment table 315 specific to the process that owns an effective address space. The application segment table 315 generally contains a mapping from an effective segment ID to a virtual segment ID. For example, with a 32-bit address as illustrated in FIG. 3, the first sixteen bits of an address may represent a segment in an effective address space 310 and may be mapped to a virtual segment in system virtual address space 320. As illustrated, effective segment ID 2003 for the process that owns effective address space $310_1$ may be mapped to virtual segment ID ABCD, while the same effective segment ID for the process that owns effective address space $310_2$ may be mapped to virtual segment ID 7890.

In the system virtual address space 320, the effective segment identifier from effective address space 310 may be replaced with the virtual segment identifier based on the mapping in application page table 315. For example, effective memory address 0x2003_1000 for the process that owns effective address space $310_1$ may map to system virtual memory address 0xABCD_1000, while the same effective memory address for the process that owns effective address space $310_2$ may map to system virtual memory address 0x7890_1000.

Using system page table 325, the system virtual memory address may be translated to a real memory address in physical memory 330. For example, a virtual memory address may be separated into three components: a segment ID, a page number within the identified segment, and a byte offset within the page. A CPU or accelerator can look up the virtual segment ID and page number in system page table 325 to obtain the real or logical address of a page and add the page offset to the page address to obtain the real or logical address for a particular system virtual address.

During context switches (e.g., from a first application with effective address space $310_1$ to a second application with effective address space $320_2$), segment tables may need to be updated to reflect the appropriate mappings between effective and system wide virtual addresses. Segment table updates may be performed by the coherent accelerator adapter during a hardware context switch.

Figure 4:
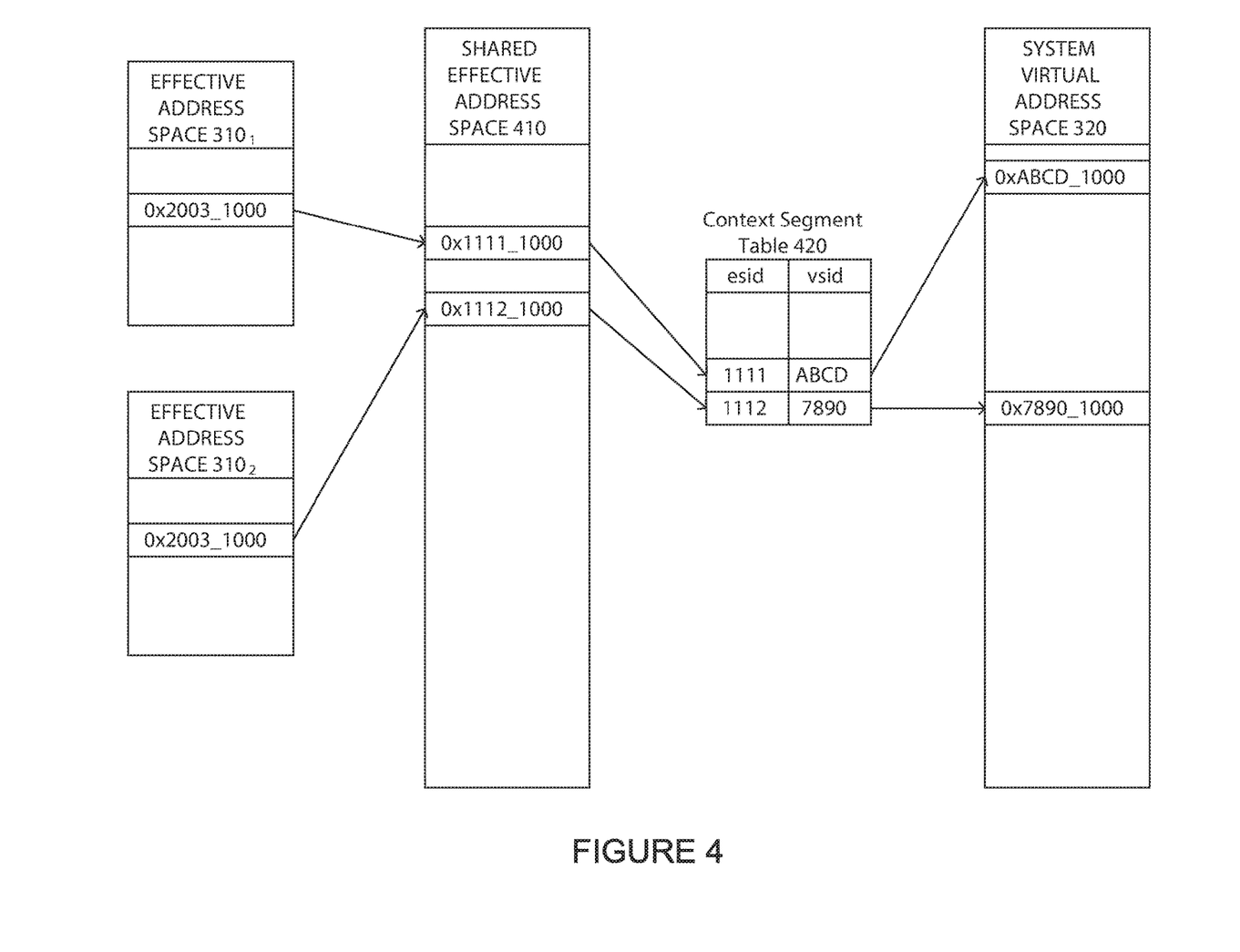
FIG. 4 illustrates an example memory system architecture in which multiple processes share a virtual address space, according to one embodiment.

As illustrated in FIG. 4, an accelerator context can have a shared effective address space 410. Multiple processes, each owning an individual effective address space 310, may be mapped to portions of the shared effective address space 410. Shared effective address space 410 may be associated, for example, with a single accelerator hardware context, and processes using the shared effective address space 410 may share the single accelerator hardware context. For example, as illustrated, an effective address 0x2003_1000 in effective address space $310_1$ owned by a first process may be mapped to a first memory address (as illustrated, 0x1111_1000) in the shared effective address space 410. Meanwhile, the same effective address in effective address space $310_2$ owned by a second process may be mapped to a second memory address (as illustrated, 0x1112_1000) in the shared effective address space 410. A global context segment table 420 contains mappings between the effective segment IDs from the shared effective address space 410 and the virtual segment IDs used in system virtual address space 320.

In some cases, long service interruptions while an accelerator performs a firmware update may not be desirable. For example, a database application that works with large quantities of data and is required to concurrently serve a large number of clients with a quality of service requirement (e.g., response time) may violate the quality of service requirements if a system reboots to apply a firmware update to an accelerator. In another example, time-sensitive data input and output through an accelerator may fail if the system reboots to apply a firmware update to an accelerator.

To minimize system downtime when an accelerator performs a firmware update procedure, processes executing on the accelerator can pause execution during the firmware update procedure, as discussed above. When the firmware update procedure completes, the processes can re-attach to and resume operations on the accelerator. By pausing process execution on the accelerator when the accelerator applies a firmware update and resets, the processes executing on the accelerator may be paused for a small amount of time (e.g., seconds) rather than a substantially longer amount of time that would elapse during a full system reboot.

Figure 5:
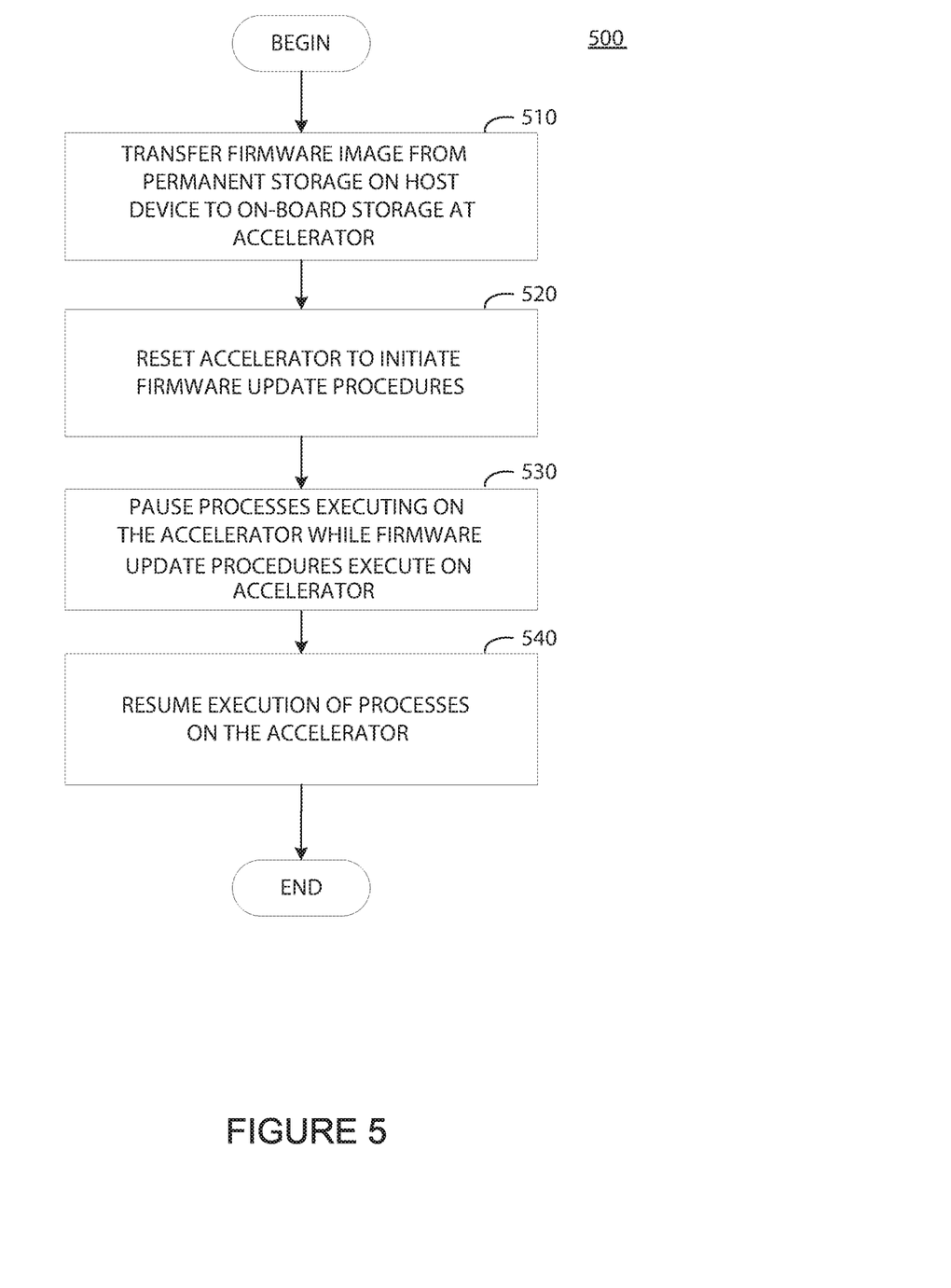
FIG. 5 illustrates example operations that may be to update accelerator firmware during system runtime, according to one embodiment.

FIG. 5 illustrates example operations 500 that may be performed by an operating system kernel to perform a concurrent update on a coherent hardware accelerator, according to an embodiment. Operations 500 begin at step 510, where the operating system kernel transfers a firmware image from permanent storage on a host device to on-board storage (e.g., a flash chip) at the coherent hardware accelerator. As discussed above, while the operating system kernel transfers the firmware image to on-board storage at the accelerator, any processes that are bound to the accelerator and perform operations using the accelerator may continue to do so without interruption.

Once the operating system completes transferring the firmware image to the accelerator, at step 520, the operating system resets the accelerator to initiate firmware update procedures. When the accelerator is reset, the accelerator may trigger enhanced error handling routines to allow an operating system kernel to (1) determine that a concurrent update is executing on the accelerator, and (2) pause operations executing on the accelerator (other than the concurrent update). In some cases, the operating system can determine that concurrent update operations are executing on an accelerator by performing a memory mapped I/O (MMIO) read from accelerator firmware. If the accelerator returns a reserved value (e.g., 0xFFFFFFFF), the operating system kernel can trigger enhanced error handling procedures. In another case, the operating system can determine that concurrent update operations are executing on an accelerator when one or more I/O operations to the accelerator firmware times out.

At step 530, as part of the enhanced error handling procedures, the operating system can pause processes executing on the accelerator while firmware update procedures execute on the accelerator. As discussed above, when the operating system kernel pauses processes executing on the accelerator, the operating system can save the state of each process executing on the accelerator and remove the contexts in which each process executes on the accelerator. For example, the operating system can save a call stack associated with the process, a program counter identifying the last instruction the accelerator processed in temporary storage, a location of the last I/O command, an interrupt source number used to identify a process, and so on.

In some cases, after the new firmware takes effect in the accelerator, the system firmware may gather configuration data from the system firmware configuration space, accelerator function unit (AFU) descriptors, and/or vital product data (VPD) and make the information available to the operation system via dynamic or static mechanisms. For example, configuration data, AFU descriptors, and/or VPD may be provided to an operating system via hypervisor calls or one or more Open Firmware Device Tree nodes. Subsequently, the operating system may discover the changed configuration from the accelerator firmware update (e.g., a change in a number of hardware contexts available on the accelerator, a change in the number of interrupts available per hardware context, a new firmware revision level, and so on) and/or enhanced functionality (e.g., additional parallel machines available inside the accelerator). As a result, the OS may discover and exploit new functionality and/or adjust parameters relating to the existing functionality of the accelerator.

At step 540, the operating system resumes execution of the processes on the accelerator after the firmware update procedure is completed. In resuming process execution on the accelerator, the operating system can create a hardware context for the process and bind the memory space associated with a process to the created hardware context. Once the operating system binds the memory space associated with a process to a hardware context, the process may resume execution from the place at which the process was paused when the firmware update procedure began (e.g., the program counter or the last I/O command).

Figure 6:
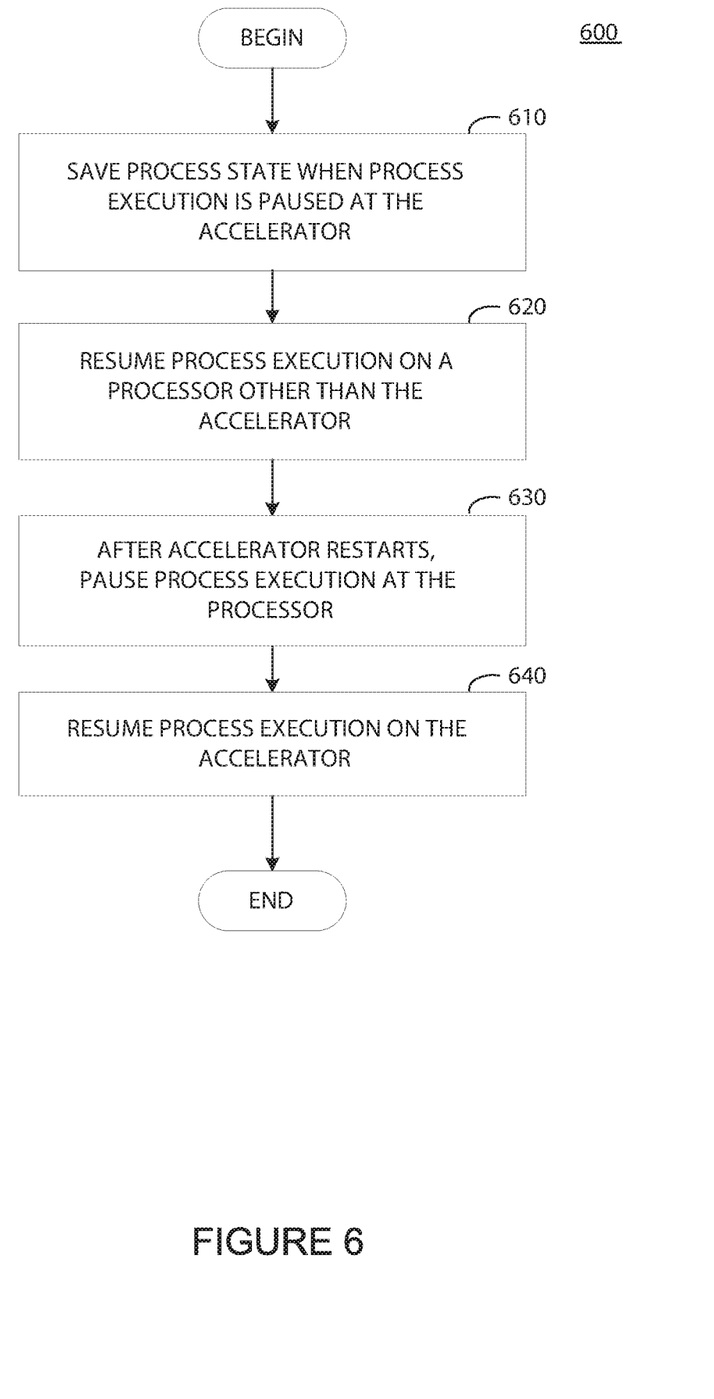
FIG. 6 illustrates example operations that may be performed by a process operating on a coherent hardware accelerator to continue operations while the accelerator performs a firmware update, according to one embodiment.

FIG. 6 illustrates example operations 600 that may be performed to migrate process execution from an accelerator device to a CPU (or processor core) during concurrent update processes on an accelerator, according to one embodiment. Operations 600 begin at step 610, where the operating system saves the state of a process when process execution on the accelerator is paused. As discussed above, saving the state of a process may include saving the call stack and a program counter indicating the most recent instruction that the accelerator executed before the operating system paused process execution on the accelerator. In some cases, saving the state of a process may include saving the last I/O command performed via the accelerator.

At step 620, the operating system resumes process execution on a processor other than the accelerator (e.g., a CPU or one or more processor cores on a CPU). To resume process execution on another processor, the operating system restores the saved process state on the CPU (e.g., call stack) and resumes operations from the location identified by the saved program counter. Acceleration may be performed in software on the CPU until the accelerator becomes available again.

At step 630, after the accelerator restarts, the operating system pauses process execution at the processor. At step 640, the operating system resumes process execution on the accelerator. As with pausing process execution at the accelerator in step 610 and resuming process execution on the CPU in step 620, pausing process execution at the CPU generally includes saving the state of the process. After binding the process and shared memory space to a hardware context of the accelerator, the operating system restores the process state to the accelerator, and the accelerator resumes operations, for example, by executing the process at the saved program counter or by redriving the last I/O operation performed on the accelerator before the firmware update occurred.

Figure 7:
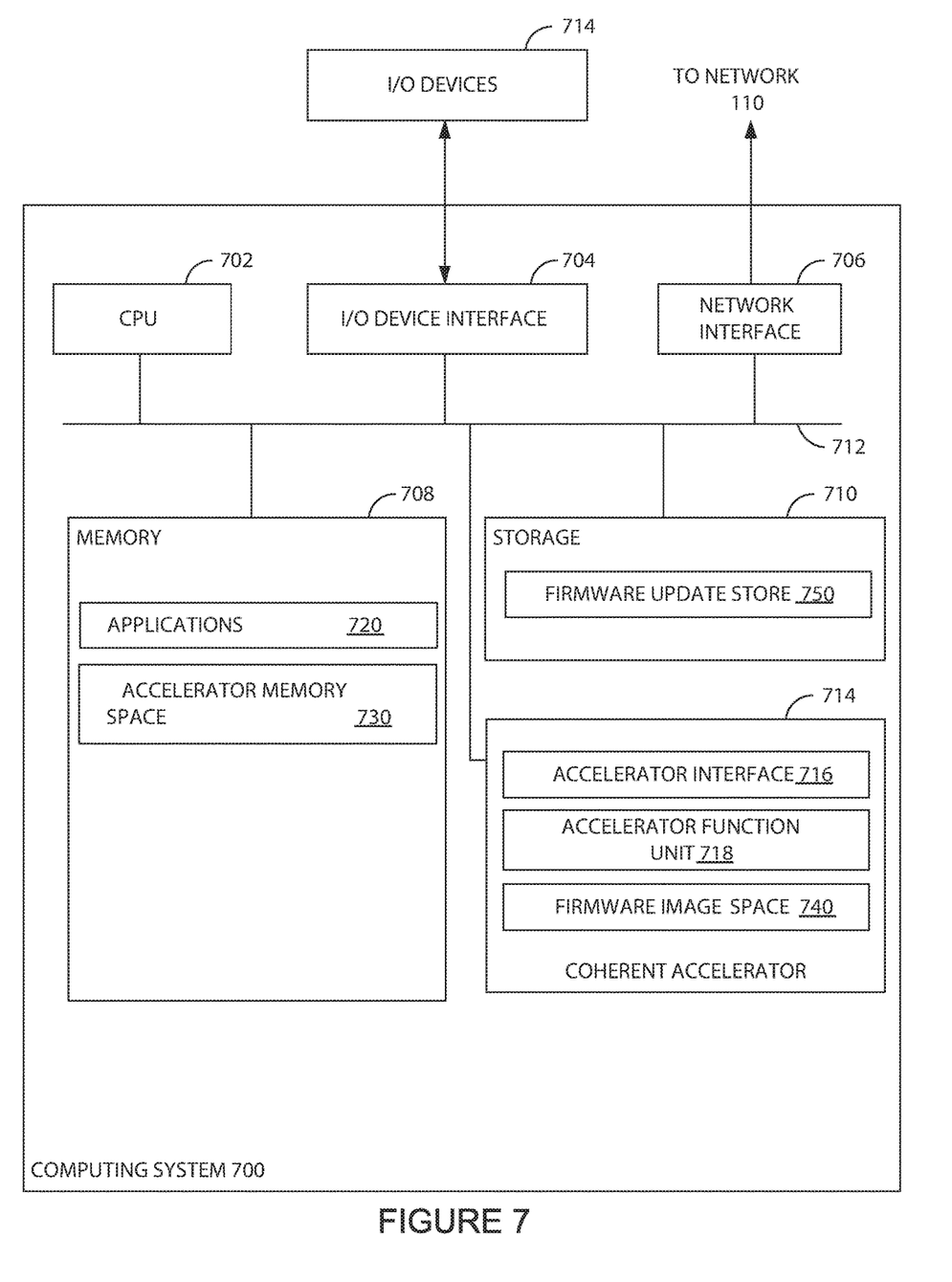
FIG. 7 illustrates an example system in which firmware for a coherent hardware accelerator is updated during system runtime, according to one embodiment.

FIG. 7 illustrates an example computing system 700 that shares a single accelerator hardware context among multiple related processes, according to an embodiment. As shown, the server includes, without limitation, a central processing unit 702, one or more I/O device interfaces 704, which may allow for the connection of various I/O devices 714 (e.g., keyboards, displays, mouse devices, pen input, etc.) to the computing system 700, network interface 706, a memory 708, storage 710, coherent accelerator 714, and an interconnect 712.

CPU 702 may retrieve and execute programming instructions stored in the memory 708. Similarly, the CPU 702 may retrieve and store application residing in the memory 708. The interconnect 712 transmits programming instructions and application data among the CPU 702, I/O device interface 704, network interface 706, memory 708, and storage 710. CPU 702 is included to be representative of a single CPU, multiple CPUs, a single CPU having multiple processing cores, and the like. Additionally, the memory 708 is included to be representative of a random access memory. Furthermore, the storage 710 may be a disk drive. Although shown as a single unit, the storage 710 may be a combination of fixed and/or removable storage devices, such as fixed disc drives, removable memory cards or optical storage, network attached storage (NAS), or a storage area-network (SAN).

Accelerator interface 716 generally allows one or more coherent accelerators 714 installed in computing system 700 to coherently access and perform operations on system memory 708. As discussed above, an accelerator interface 716 may provide an interface to a coherent processor proxy unit at CPU 702 to allow the accelerator to share the segment and page tables established by CPU 702 for operations on system memory. As processes execute on a CPU 702 or a coherent accelerator 714 and change the state of the segment and/or page tables, changes made by one of the CPU 702 or coherent accelerator 714 may be propagated to the other of CPU 702 or coherent accelerator 714.

As shown, memory 708 includes one or more applications 720 and a shared memory space 730. Shared memory space 730 may be a virtual address space common to both the CPU 702 and coherent accelerator 714 so as to provide for memory coherence between the CPU 702 and coherent accelerator 714. As discussed above, applications may use a coherent accelerator 714 through accelerator interface 716 by establishing a shared memory space 730 and binding processes associated with the application to the shared memory space 730 and a single accelerator hardware context. During firmware update operations, applications 720 executing on a coherent accelerator 714 may be paused until the accelerator restarts and applies the firmware update. After the coherent accelerator 714 restarts, the process execution resumes on the coherent accelerator (e.g., memory accesses are performed through accelerator interface 716, and operations on the accelerator are performed on accelerator function unit 718).

As shown, storage 710 includes a firmware update store 750. Firmware image packages may be retrieved from a remote source and stored in firmware update store 750 until a user transfers a downloaded firmware image to firmware image space 740 in the appropriate coherent accelerator 714. In some cases, a backup copy of the previous firmware image may be saved in firmware image space 740 at coherent accelerator 714 or in firmware update store 750 at storage 710 before an accelerator begins firmware update procedures, which may allow a user to roll back a firmware update if the update results in, for example, system instability.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the entity analytics system) or related data available in the cloud. For example, the entity analytics system could execute on a computing system in the cloud and determine relationships between different entities stored in the entity analytics system, for example, based on determining relationships between sub-entities. In such a case, the entity analytics system could receive an input specifying parameters for the entity analytics system to search for and determine relationships between entities and store information about the determined relationships at a storage location in the cloud.

Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer program product to update a firmware image on a coherent hardware accelerator concurrently with executing operations, the computer program product comprising:
a computer-readable storage medium having computer-readable program code embodied therewith, the computer-readable program code configured to perform a function comprising:
while executing a set of operations on the coherent hardware accelerator, storing a firmware update package on the coherent hardware accelerator;
prior to applying the firmware update package, pausing execution of the set of operations on the coherent hardware accelerator and resuming execution of the set of operations on a processor other than the coherent hardware accelerator; and
subsequent to applying the firmware update package to the firmware image, pausing execution of the set of operations on the processor and resuming execution of the set of operations on the coherent hardware accelerator.

2. The computer program product of claim 1, wherein the set of operations includes a first operation, wherein pausing the set of operations executing on the coherent hardware accelerator comprises saving at least one of:
one or more interrupt source numbers identifying the first operation;
a range of memory mapped input/output (I/O) (MMIO) addresses associated with the first operation;
a program counter associated with an instruction most recently executed by the first operation; or
a most recently executed I/O command associated with the first operation.

3. The computer program product of claim 2, wherein the set of operations includes a first operation, wherein resuming the set of operations comprises restoring at least one of the one or more interrupt source numbers, the range of MMIO addresses associated with the first operation, the program counter associated with an instruction most recently executed by the first operation, or the most recently executed I/O command associated with the first operation.

4. The computer program product of claim 1, wherein the set of operations executing on the coherent hardware accelerator is paused in response to at least one of:
detecting a timeout condition when the set of operations attempts to transmit a command to the coherent hardware accelerator; or
detecting a reserved value when the set of operations queries the coherent hardware accelerator for a state of the coherent hardware accelerator.

5. The computer program product of claim 1, wherein the set of operations comprises a set of accelerator-enabled operations.

6. The computer program product of claim 1, wherein the function further comprises:
performing one or more subsequent operations supported by the coherent hardware accelerator with the firmware update package applied, wherein the one or more subsequent operations are not supported by the coherent hardware accelerator prior to applying the firmware update package.

7. The computer program product of claim 1, wherein the firmware update package is stored in a local memory on the coherent hardware accelerator, wherein the execution of the set of operations is resumed using a software algorithm executing on the processor other than the coherent hardware accelerator, wherein the function further comprises applying the firmware update package to the firmware image on the coherent hardware accelerator.

8. The computer program product of claim 7, wherein applying the firmware update package includes restarting the coherent hardware accelerator, wherein the function further comprises:
while resuming the paused operation on the coherent hardware accelerator, querying a configuration of the updated coherent hardware accelerator and making the configuration available to an operating system for discovery and use in one or more subsequent operations, wherein the subsequent operations are performed;
wherein the one or more subsequent operations are supported by the coherent hardware accelerator with the firmware update package applied, wherein the one or more subsequent operations are not supported by the coherent hardware accelerator prior to applying the firmware update package, wherein the configuration is made available via, in respective instances, a hypervisor call and a device tree node.

9. The computer program product of claim 8, wherein the set of operations includes a first operation, wherein pausing the set of operations executing on the coherent hardware accelerator comprises saving, in respective instances, each of:
the one or more interrupt source numbers identifying the first operation;
the range of memory mapped input/output (I/O) (MMIO) addresses associated with the first operation;
the program counter associated with the instruction most recently executed by the first operation; and
the most recently executed I/O command associated with the first operation.

10. The computer program product of claim 9, wherein resuming the set of operations comprises restoring: at least one of the one or more interrupt source numbers, the range of MMIO addresses associated with the first operation, the program counter associated with an instruction most recently executed by the first operation, or the most recently executed I/O command associated with the first operation.

11. The computer program product of claim 10, wherein resuming the set of operations comprises restoring: at least one of the one or more interrupt source numbers, the range of MMIO addresses associated with the first operation, the program counter associated with an instruction most recently executed by the first operation, and the most recently executed I/O command associated with the first operation.

12. The computer program product of claim 11, wherein the set of operations executing on the coherent hardware accelerator is paused in response to at least one of:
detecting a timeout condition when the set of operations attempts to transmit a command to the coherent hardware accelerator; or
detecting a reserved value when the set of operations queries the coherent hardware accelerator for a state of the coherent hardware accelerator.

13. The computer program product of claim 12, wherein the set of operations executing on the coherent hardware accelerator is paused in response to, in respective instances, each of:

detecting the timeout condition when the set of operations attempts to transmit the command to the coherent hardware accelerator; and detecting the reserved value when the set of operations queries the coherent hardware accelerator for the state of the coherent hardware accelerator.

14. The computer program product of claim 13, wherein the software algorithm executes on one or more computer processors executing the computer-readable program code, wherein the set of operations includes the one or more subsequent operations, wherein the coherent hardware accelerator provides a framework to transfer data to and from application memory without using direct memory access (DMA).

15. A system to update a firmware image on a coherent hardware accelerator concurrently with executing operations, the system comprising:
a processor;
the coherent hardware accelerator; and
a memory storing one or more instructions executable to perform a function comprising:
while executing a set of operations on the coherent hardware accelerator, storing a firmware update package on the coherent hardware accelerator;
prior to applying the firmware update package, pausing execution of the set of operations on the coherent hardware accelerator and resuming execution of the set of operations on the processor; and
subsequent to applying the firmware update package to the firmware image, pausing execution of the set of operations on the processor and resuming execution of the set of operations on the coherent hardware accelerator.

16. The system of claim 15, wherein the set of operations includes a first operation, wherein pausing the set of operations executing on the coherent hardware accelerator comprises saving at least one of:

one or more interrupt source numbers identifying the first operation;
a range of memory mapped input/output (I/O) (MMIO) addresses associated with the first operation;
a program counter associated with an instruction most recently executed by the first operation; or
a most recently executed I/O command associated with the first operation.

17. The system of claim 16, wherein the set of operations includes a first operation, wherein resuming the set of operations comprises restoring at least one of the one or more interrupt source numbers, the range of MMIO addresses associated with the first operation, the program counter associated with an instruction most recently executed by the first operation, or the most recently executed I/O command associated with the first operation.

18. The system of claim 15, wherein the set of operations executing on the coherent hardware accelerator is paused in response to at least one of:
detecting a timeout condition when the set of operations attempts to transmit a command to the coherent hardware accelerator; or
detecting a reserved value when the set of operations queries the coherent hardware accelerator for a state of the coherent hardware accelerator.

19. The system of claim 15, wherein the set of operations comprises a set of accelerator-enabled operations.

20. The system of claim 15, wherein the function further comprises:
performing one or more subsequent operations supported by the coherent hardware accelerator with the firmware update package applied, wherein the one or more subsequent operations are not supported by the coherent hardware accelerator prior to applying the firmware update package.

* * * * *